April 7, 1959  R. G. FRIEDMAN  2,880,854
METAL DRAWING AND FEEDING APPARATUS
Filed Sept. 10, 1956  9 Sheets-Sheet 1

INVENTOR.
ROBERT G. FRIEDMAN
BY
RICHEY, WATTS, EDGERTON & McNENNY
ATTORNEYS

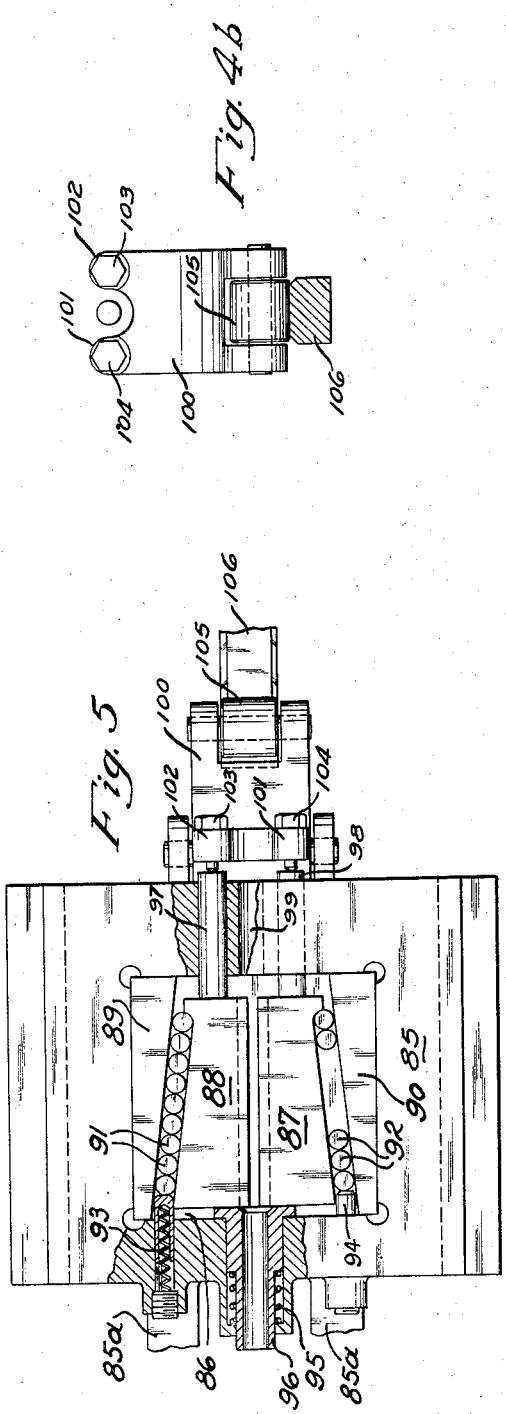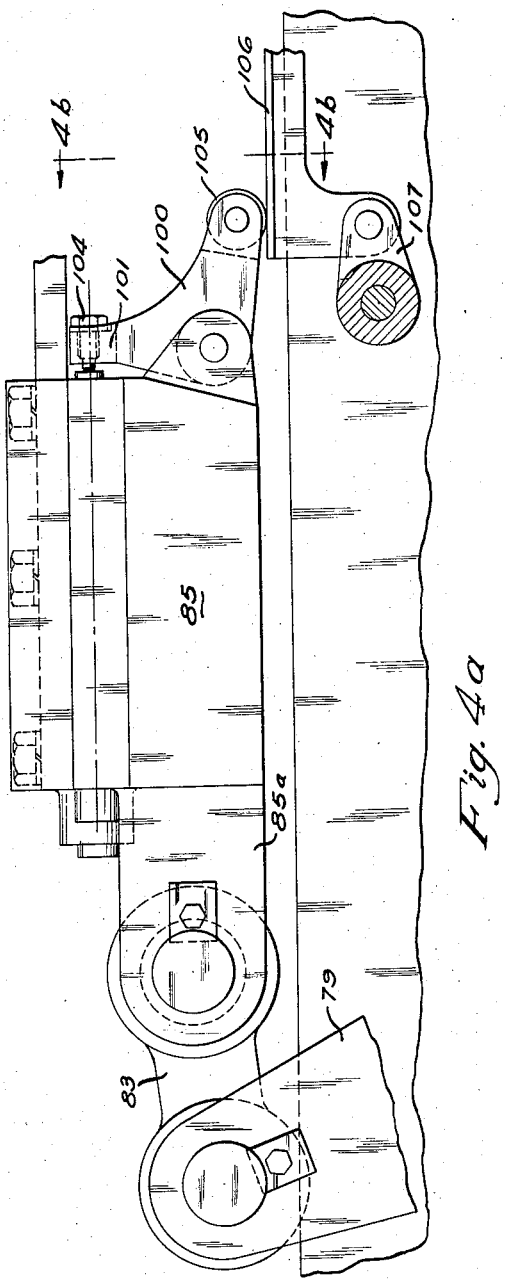

April 7, 1959 R. G. FRIEDMAN 2,880,854
METAL DRAWING AND FEEDING APPARATUS
Filed Sept. 10, 1956 9 Sheets-Sheet 6

INVENTOR.
ROBERT G. FRIEDMAN
BY
RICHEY, WATTS, EDGERTON & McNENNY
Donald W. Farrington
ATTORNEYS April 7, 1959  R. G. FRIEDMAN  2,880,854
METAL DRAWING AND FEEDING APPARATUS
Filed Sept. 10, 1956  9 Sheets-Sheet 8

INVENTOR.
ROBERT G. FRIEDMAN
BY
RICHEY, WATTS, EDGERTON & McNENNY
Donald W. Farrington
ATTORNEYS

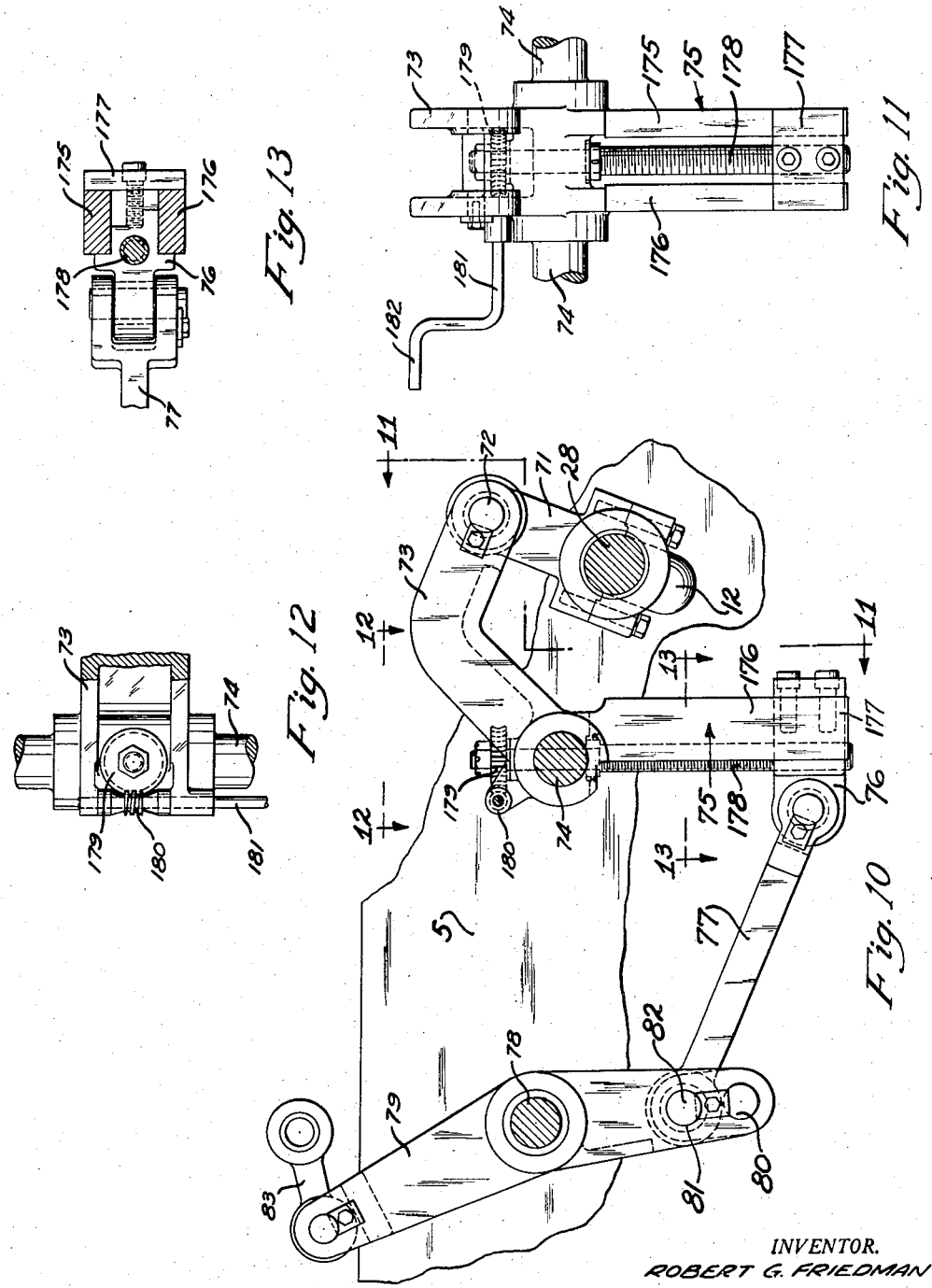

United States Patent Office 2,880,854
Patented Apr. 7, 1959

2,880,854

METAL DRAWING AND FEEDING APPARATUS

Robert G. Friedman, Tiffin, Ohio, assignor to The National Machinery Company, Tiffin, Ohio, a corporation of Ohio Application September 10, 1956, Serial No. 608,921

10 Claims. (Cl. 205—16)

The invention relates to apparatus for drawing and feeding wire or rod stock into a machine for making bolts, nuts and the like.

Numerous attempts have been made to provide a machine which would draw wire or rod stock to a predetermined diameter and which would advance the drawn stock accurately into a machine having a stock gauge so that blanks sheared from the stock would be uniform with respect to the volume of metal in the cut blank.

It has been the experience of the trade generally that the prior art machines provided for combined drawing and feeding and were constructed and arranged so that the drawing operations adversely affected the feeding operations, and that the drawing and feeding operations were out of phase and in opposed directions so that the drawing operation imparted to the stock a movement away from the stock gauge and made it difficult or impossible to maintain a uniform volume of metal in the cut blank. It has heretofore been proposed to grip and hold the stock while a drawing die was moved along the stock in a direction away from the stock gauge. After a given length of stock was drawn in this manner the grip on the stock was released and the drawing die permitted to move with the stock toward the stock gauge while the drawn stock was advanced against the stock gauge by feed rolls or reciprocating feed slides arranged to grip and carry the stock toward the stock gauge. The type of grip means heretofore provided in such machines have required a limited amount of relative movement between the stock and the gripping device to bring the gripping device into full holding engagement on the stock. Thus it has been observed when operating the prior art devices that after the stock has been fed against a stock gauge and an attempt is made to grip and hold the stock in position while the drawing die is moved away from the stock gauge, the stock moves a limited distance away from the stock gauge before it is held securely.

It is among the objects of my invention to provide a drawing and feeding apparatus wherein the stock is fed in the same direction and at the same time the stock is being reduced by drawing.

It is a further object of my invention to provide a drawing and feeding apparatus wherein the stock is pulled through a drawing die by the same means which grips the stock and advances the stock against a stock gauge.

It is a further object of my invention to provide an apparatus according to the preceding objects wherein the grip means engaging the stock for drawing and feeding may be released with respect to the stock independent of any relative longitudinal movement of the gripping means with respect to the stock.

It is a further object of my invention to provide a machine according to the preceding objects wherein the gripping means for the stock is carried by a reciprocating slide and the gripping means may be controlled to grip or release the stock independently of the travel of the slide.

It is a further object of my invention to provide stock feeding apparatus wherein the wire or rod stock is advanced into a bolt or nut-forming machine against a stock gauge therein by a pair of wedge grippers carried in a feed slide which moves in timed relation to the header slide on the bolt or nut-forming machine and wherein the feed slide is provided with means to release the wedge grippers with respect to the stock at any point during the travel of the slide toward the stock gauge.

Further objects and advantages relating to accurate drawing and accurate feeding will appear from the following description and the appended drawings wherein:

Fig. 4a is an elevation with parts broken away showing the linkage drive for reciprocating the feed slide and the stock grip releasing device carried by the feed slide;

Fig. 4b is an end elevation with parts in section taken on the plane indicated at 4b—4b of Fig. 4a;

Fig. 5 is a plan view with parts in section of the grip slide carrying the wedge grippers to engage the wire stock and advance the same against a stock gauge;

Fig. 10 is a longitudinal elevation with parts broken away showing the lever arrangement employed to convert rotational drive from the chain to oscillating motion for reciprocating the feed slide toward and away from the stock gauge;

Fig. 11 is a view taken as indicated by the plane 11—11 of Fig. 10 showing the means for adjusting the reciprocating stroke of the feed slide during operation;

Fig. 12 is a plan view of the feed stroke adjusting means taken along the plane indicated at 12—12 of Fig. 11; and Fig. 13 is a sectional showing taken along the plane indicated at 13—13 of Fig. 10.

Figure 1:
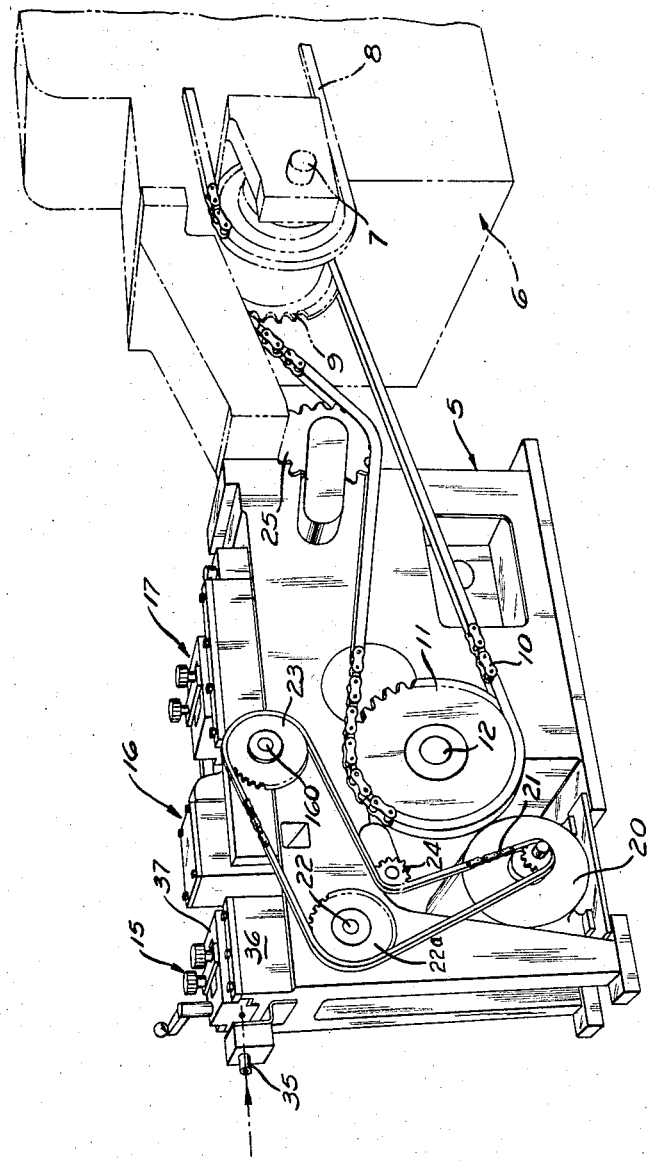
Fig. 1 is a perspective view of a drawing and feeding mechanism according to the present invention and arranged to be driven by a bolt or nut-forming machine.

Referring to the drawings, the feeding and drawing apparatus is indicated in its entirety as at 5 of Fig. 1 as arranged in alignment with and driven by a machine for forming bolts or nuts indicated in phantom outline as at 6.

It will be understood that the machine 6 for making bolts or nuts includes a reciprocating header slide driven by the crankshaft and that the machine 6 includes a countershaft 7 driven by a chain 8 from a sprocket on the crankshaft so that the countershaft 7 turns at the same speed as the crankshaft of the machine 6. A chain sprocket 9 driven by the shaft 7 drives the feeding and drawing means 5 through the chain 10. The driven chain sprocket 11 is the same size as the driving sprocket 9 so that the shaft 12 of the machine 5 turns in synchronism with the crankshaft on the machine 6 so that the feeding of the stock into the machine 6 will be synchronized with the shearing mechanism and the header slide of the machine 6.

The feeding and drawing apparatus 5 comprises three co-operating assemblies indicated in Fig. 1 as at 15, 16 and 17 wherein the assembly 15 comprises a reciprocating slide arranged to advance the stock from a reel or coil into the drawing die assembly indicated in its entirety as at 16. Since the stock is forced into the drawing die by pushing, the reciprocating slide of assembly 15 may be characterized as a stock pushing slide. The drawing die in assembly 16 is arranged to be rotated as the stock is fed therein by the assembly 15. After a predetermined length of stock has been advanced through the drawing die assembly 16 the drawn stock is gripped and advanced against a stock gauge in the machine 6 by grip dies carried in a reciprocating slide forming a part of the assembly indicated at 17. Since the stock is pulled through the drawing die the reciprocating slide forming a part of assembly 17 may be characterized as a stock pulling slide.

It will be understood that when the assembly 17 is in operation the stock advanced thereby is moved into the bolt or nut-forming machine 6 against a stock gauge and that such advancing movement of the stock by the assembly 17 is synchronized with the crankshaft and header slide movement. As such stock is being advanced into machine 6 it is being pulled through a drawing die which forms a part of the assembly 16. The drawing die carried by assembly 16 is not rotated when the feed assembly 17 is employed to advance the stock into the machine 6.

A driving motor 20 is carried in the frame of the machine 5 and a chain sprocket from the driving motor 20 drives the chain 21 to rotate the shaft 22 which reciprocates the starting feed slide included in the assembly 15. The chain 21 also drives sprocket 23 which is geared to the drawing die so as to rotate the drawing die included in the assembly 16 as the starting feed assembly 15 is being operated. Idler sprockets 24 and 25 are employed in connection with the chains 21 and 10, respectively, to maintain tension in the chain and guide the chain in a path avoiding other parts of the machine.

Figure 2:
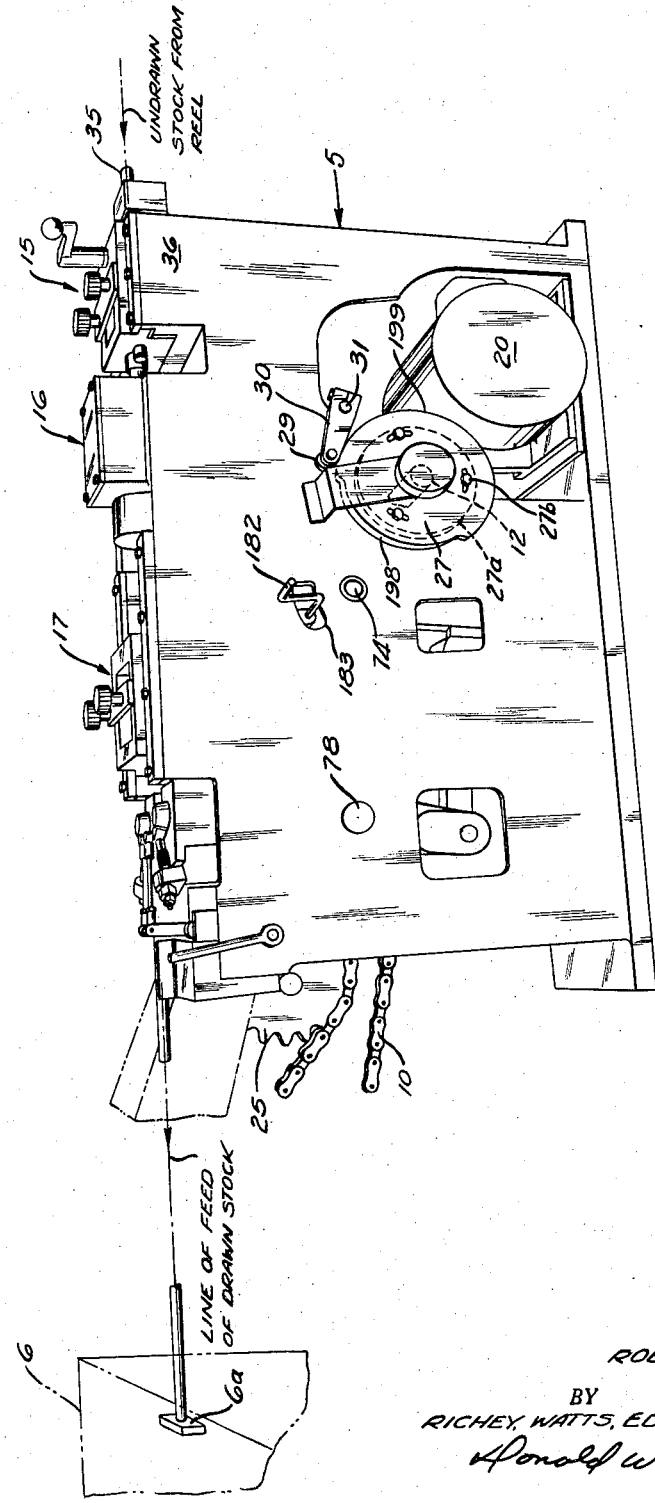
Fig. 2 is a perspective view of the wire drawing and feeding apparatus taken from the opposite side of the machine from that shown in Fig. 1.
Figure 3:
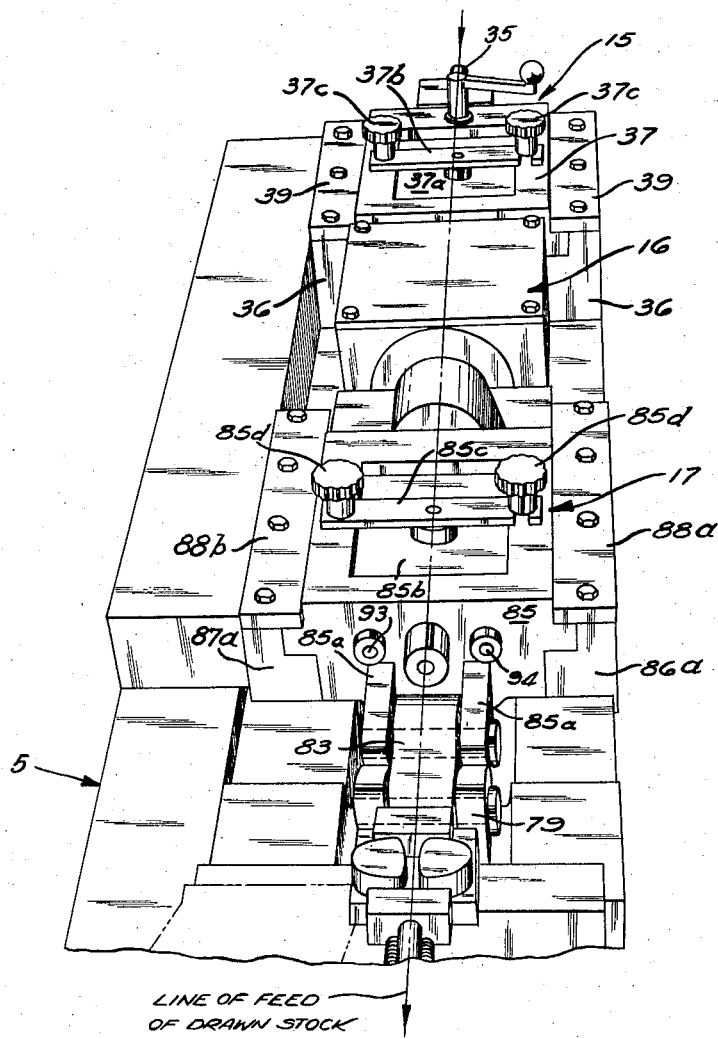
Fig. 3 is a perspective view looking downwardly toward the drawing and feeding apparatus from that end of the apparatus adjacent the bolt or nut-forming machine.

The shaft 12 is journaled transversely of the frame and is provided on its end projecting through the left-hand side of the frame (as shown in Fig. 2) with a cam 27. That portion of the shaft 12 which is disposed between the vertical sides of the frame is provided with an eccentric crank 28. Thus the shaft 12 with the crank 28 and the cam 27 is employed to convert the rotation of the shaft 12 to oscillating motion reciprocating the feed slide 85 and at the same time operate the grip and release of the stock being fed.

Figure 4:
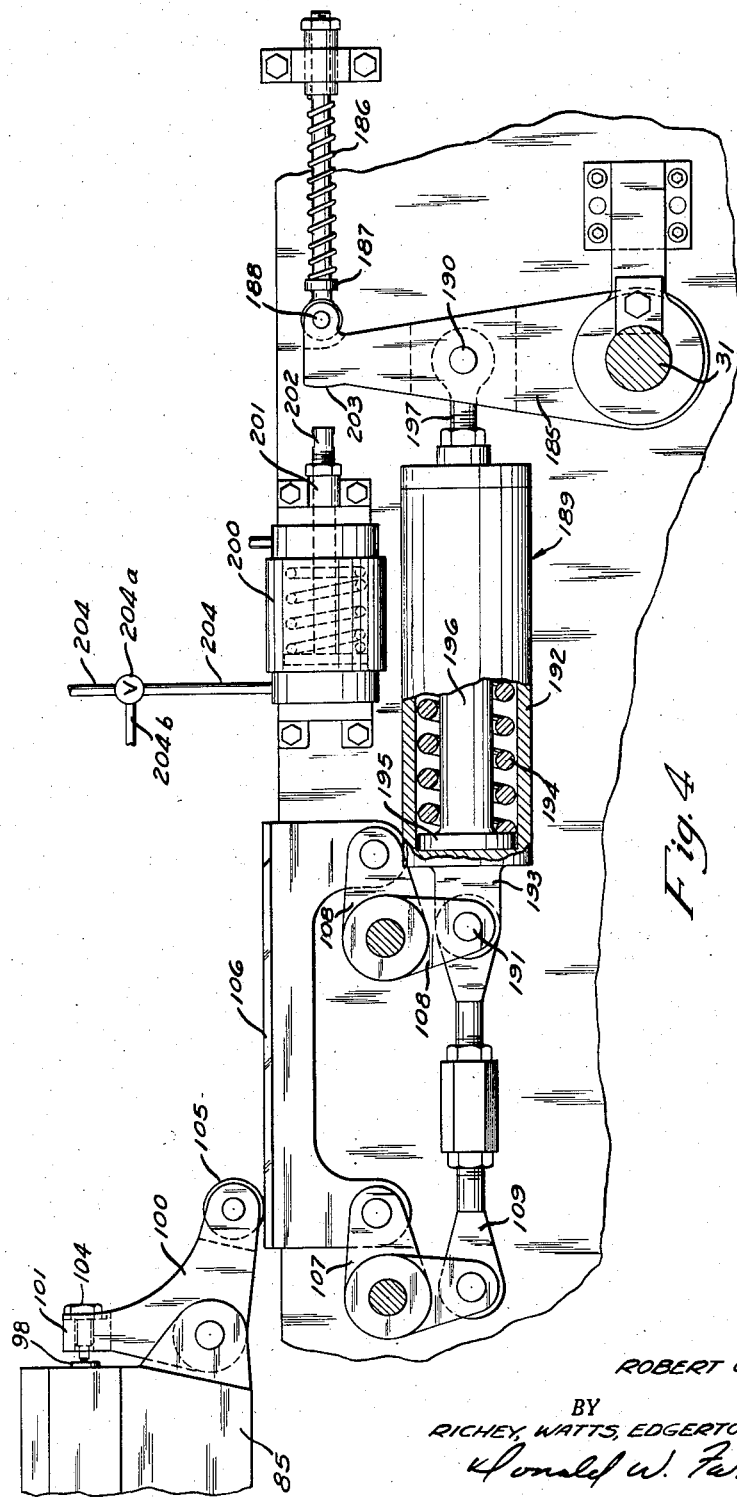
Fig. 4 is an elevation with parts in section showing the arrangement of the levers and linkage employed for releasing the grip on the stock being fed as the grip slide advances the stock toward the bolt or nut-forming machine.

The cam 27 at the left-hand side of the machine is provided with a cam follower 29 carried by an arm 30 fixed to a transverse rock shaft 31. The rocking of the shaft 31 resulting from the rotation of cam 27 is utilized as shown in Fig. 4 to operate the linkage effecting a release of the grip mechanism carried by the feed slide 85. The cam 27 along with the shaft 31 is arranged so that the grip on the stock being fed may be released independently of the travel of the slide 85 which advances the stock.

The stock to be drawn and fed is introduced to the drawing and feeding apparatus through a quill 35 mounted at that end of the machine adjacent the assembly 15. The bed frame of the machine is provided with a pair of opposed horizontally disposed guideways 36 to receive and guide the reciprocating pushing slide 37. The slide 37 has at each side thereof horizontally disposed tongues 38 which ride in the guideways 36 and are held in position by plates 39 bolted to the guideways 36. To reciprocate the slide 37 a crank pin 40 is mounted in the frame between the guideways 36 and the upper end of the crank pin 40 as at 41 and is offset with respect to the pin 40 so as to reciprocate a cross head block 42 carried in a transverse opening 43 in the pushing slide 37.

It will be noted particularly from Figs. 6 to 9 that the rectangular transverse opening 43 is wider than the block 42 so that the block may slide from side to side as the crank pin 40 is rotated and that only the motion of the crank in the direction of the feed is effective to reciprocate the pushing slide 37. The upper face of the slide 37 is provided with a rectangular opening 44. The bottom of the opening 44 is closed by a rectangular plate 45 which supports the wedge assembly carried within the rectangular opening 44. The wedge grip assembly includes a pair of wedges 46 and 47 with grooves at their opposed faces to embrace the wire stock to be fed into the drawing die. Fixed wedges 48 and 49 fit snugly in the opening 44 and provide an inclined face generally parallel to an inclined face on the wedges 46 and 47 respectively.

A series of vertically disposed rollers 50 and 51 are interposed between the moving wedges 46—47 and the fixed wedges 48—49. Each series of rollers is biased toward the right as viewed in Fig. 8 by a spring-pressed plunger assembly 52 and 53. The wedges 46 and 47 are provided with a lug 46a and 47a, respectively, at its narrow end so that the expansion spring in the assembly 52 tends to move the rollers 51 into engagement with each other in the space between the moving wedge and the fixed wedge. Similarly, the expansion spring in assembly 53 urges the rollers 50 into engagement with each other in the space between the moving wedge and the fixed wedge. The leading end (left-hand end in Fig. 8) of the reciprocating pushing slide 37 is provided with a movable quill 55 having a flanged head portion 56 bearing partially against the leading edge of the wedge 46 and partially against the leading edge of the wedge 47. The quill 55 is normally urged toward the trailing end of the slide 37 by a coil spring 57 so that the two wedges 46 and 47 are normally biased toward the trailing end of the block 37 and thus into their wire gripping position. The trailing end (right-hand in Fig. 8) of the slide 37 is provided with an adjustable quill 58 which extends through a bore in the slide to engage the trailing end faces of the wedges 46 and 47. The quill 58 may be fixed in adjusted position by the clamping screw 59 and is so adjusted from time to time to limit the rearward position of the wedges 46 and 47 within the slide 37 depending upon the diameter of the wire which is to be gripped.

Figures 8, 9:
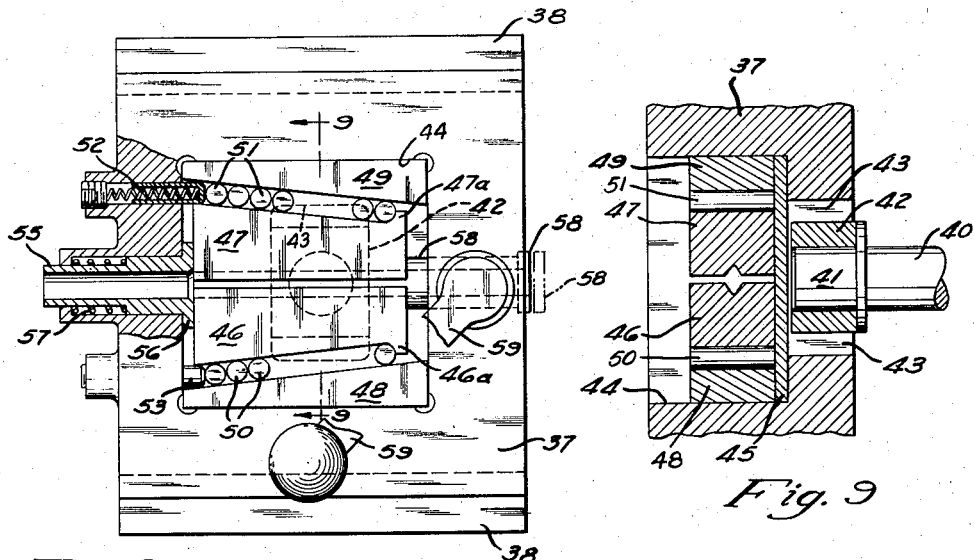
Fig. 8 is a plan view of the grip slide for starting the undrawn wire stock into the drawing die.
Fig. 9 is a sectional view taken on the plane indicated at 9—9 of Fig. 8.
Figure 7:
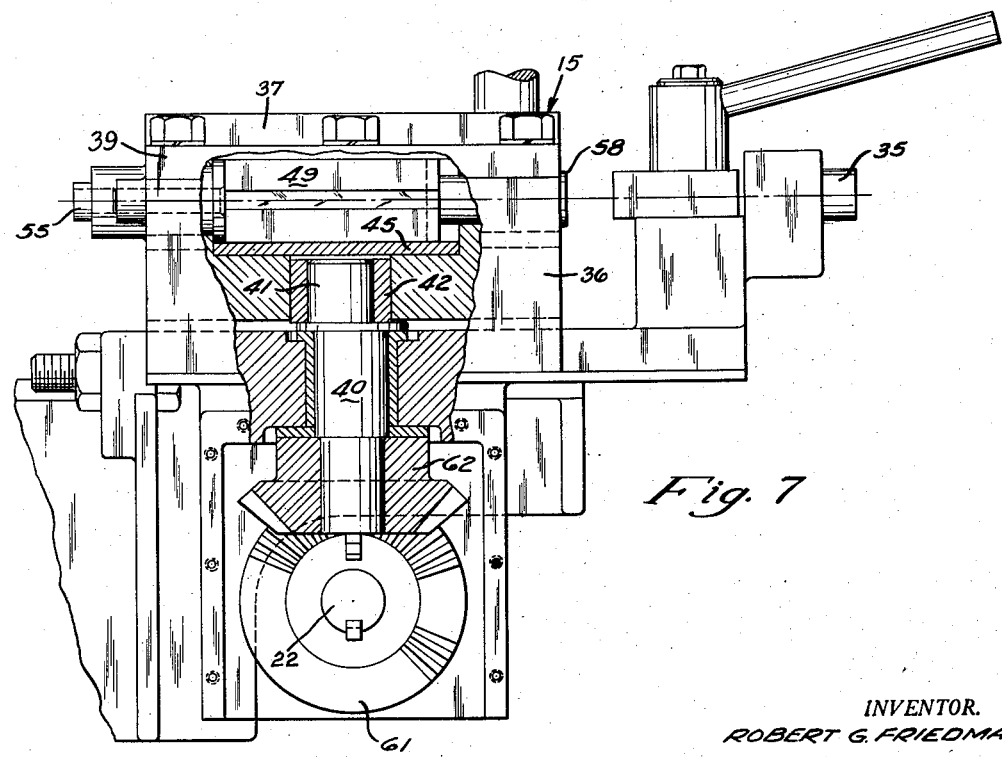
Fig. 7 is a longitudinal elevation with parts in section of the feed means for starting the undrawn wire stock into the drawing die, taken at right angles to the view of Fig. 6.

It will be understood that when the slide 37 is not reciprocated and that when the stock is to be merely guided through the slide 37 toward the drawing die, the wedges 46 and 47 will be adjusted and held in an open position by the quill 58 as in Fig. 8 so that they will not engage the wire being moved through the slide 37 to the drawing die.

It will also be understood that when the quill 58 is moved from its full line position (as shown in Fig. 8) to its dotted line position, the wedges 46 and 47 will be moved by the spring 57 toward the trailing end of the slide 37 so as to grip the wire between the wedges 46 and 47. With the quill 58 in its dotted line position, and the slide 37 is retracted away from the drawing die, the relative movement between the wedges 46 and 47 and the slide 37 will cause the wedges to be moved to a released position with respect to the wire. Conversely, as soon as the motion of the slide 37 is changed from a retracting motion and is moved toward the drawing die, the spring 57 and quill 55 causes the wedges 46 and 47 to grip the wire and the wire to be carried toward the drawing die along with the slide 37. In this way stock from a reel is advanced in small increments as determined by the eccentricity of the crank 41 with respect to the axis of the pin 40 toward the drawing die assembly 16.

The wedge assembly in 15 is covered during operations by a cover plate 37a provided with a pivoted hook bar 37b. The hook portions on bar 37b are clamped to the slide 37 by thumb screws 37c.

The shaft 22 provided with sprocket 22a is journaled in the frame and extends inwardly thereof to terminate beneath the reciprocating slide 37. The inner end of the shaft 22 is provided with a beveled gear 61 which meshes with a beveled gear 62 at right angles thereto so as to transmit the rotation of the shaft 22 to the eccentric crank pin 41.

Figure 4C:
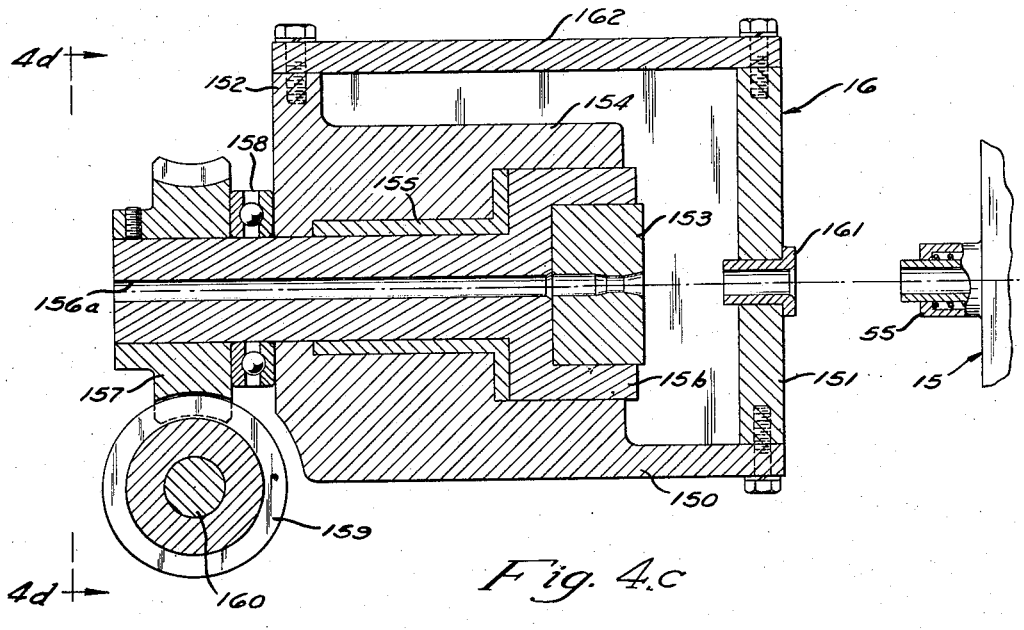
Fig. 4c is a longitudinal sectional view showing the drive for the rotating drawing die forming a part of the drawing and feeding machine.
Figure 4D:
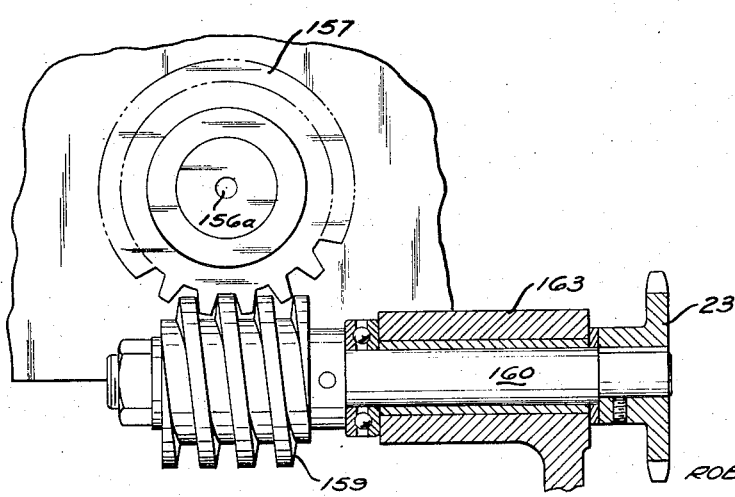
Fig. 4d is a view of the drive for rotating drawing die taken on the plane indicated at 4d—4d of Fig. 4c.
Figure 6:
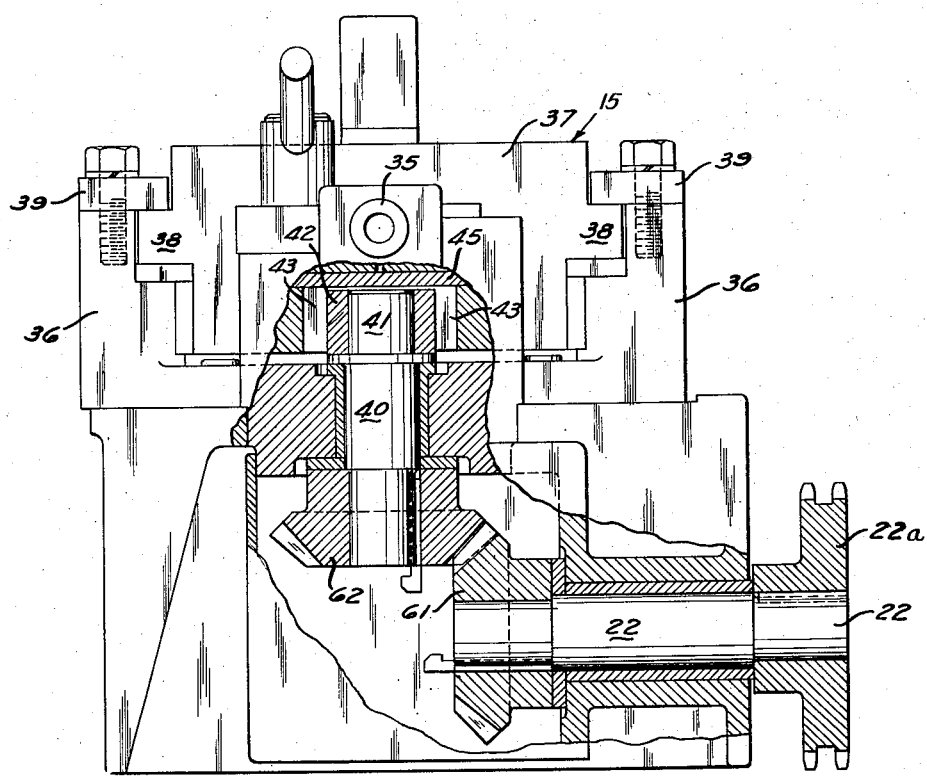
Fig. 6 is a transverse elevation with parts in section showing the drive for the reciprocating feed apparatus employed to start the stock into the drawing die.

The drawing die assembly, indicated in its entirety as at 16 in Fig. 1, is shown in detail in Fig. 4c wherein a box having a bottom wall 150, a detachable front wall 151 and a back wall 152 is provided. The side walls parallel to the sides of the machine complete the enclosure for the rotating drawing die 153. Integrally formed with the back wall 152 and the bottom wall 150 is a boss 154 provided with a sleeve bearing 155 which reecives a rotatable die holder 156. The die holder 156 is proportioned so as to project through an opening in the back wall 152 and has keyed to its projecting end a driven worm gear 157. A thrust bearing as at 158 is inserted between the face of the gear 157 and the back wall of the die box so as to maintain the driven gear 157 in alignment with the driving gear 159 fixed to the shaft 160. The shaft 160 is driven by sprocket 23 as shown in Fig. 1 and Fig. 4d.

The stock is introduced into the drawing die through the bushing 161 carried in the front wall 151 of the die box and such stock is fed in through the bushing by the starting feed mechanism indicated at 15. The die box is supplied with a quantity of drawing die lubricant in powdered form and such lubricant is retained in the space between the die 153 and the front wall 151 of the die box. The open top of the die box is provided with a cover 162 which is removed from time to time for adding drawing die lubricant. The driving gear 159 is mounted on the shaft 160 which is journaled in a boss 163 formed in the bed frame of the machine as best shown in Fig. 4d. The end of the shaft 160, extending beyond the vertical side of the bed frame, is provided with a chain sprocket 23 driven by the chain 21 and motor 20.

As the starting feed assembly 15 advances stock into the rotating drawing die 153, the stock progresses through the bore 156a and out of the bore 156a into the feed assembly 17. When a sufficient length of stock has been advanced through the drawing die 153 so that it may be gripped by the wedges 87 and 88, the motor 20 may be shut off and the bolt or nut-forming machine 6 started. As the chain 10 drives the shaft 12, the stock is pulled through the drawing die 153 which is no longer rotating. Thus it will be understood that when the feed block 85 is utilized, the stock is pulled through the die 153 which is stationary whereas prior to the pull by means of pulling slide 85, the die 153 is rotating and the stock is reduced by being pushed into the rotating die.

After a predetermined length of stock has been advanced by the assembly 15 through the rotating drawing die, the motor 20 is shut off and the crankshaft 12 is rotated by starting the bolt or nut-forming machine 6. The rotating motion of the crankshaft 12 is converted to reciprocating motion of the assembly 17 by the lever arrangement illustrated in Fig. 10. The crank 28 on the crankshaft 12 is provided with a pitman 71 which is pivotally connected as at 72 to a bell crank arm 73 carried by a transverse shaft 74 journaled in the frame. Integral with the bell crank arm 73 is an arm 75 which carries an adjustable pivot block 76 pivotally connected to link 77.

A shaft 78 extends transversely of the frame and is journaled in the frame to support a pivot lever 79. The lower arm of the lever 79 is provided with two or more apertures 80—81 to receive a pivot pin 82 for pivotally connecting the link 77 to the lever arm 79. The link 77 is shown in Fig. 10 as connected to the arm 79 so as to provide a relatively long stroke at the upper end of the arm 79, which stroke would be suitable for making relatively long articles such as bolts. With the link 77 connected to the arm 79 at the lower opening 80, a shorter stroke is imparted to the upper end of the arm 79 which would be suitable for making articles such as nut in the machine 6.

To vary the magnitude of the feeding stroke within narrow limits, the pivot block 76 is slidably mounted on the arm 75 by the means illustrated in Figs. 10 to 13. The arm 75 comprises a pair of spaced elements 175 and 176 and a portion of the block 75 is adapted to fit between the arms and secured slidably on the arms by a plate 177 overhanging the two arms 175 and 176. The block 76 is interiorly threaded to receive a long threaded bolt 178 which is journaled in the bell crank and extends through the shaft 74. The projecting upper end of the bolt 178 is provided with a worm gear 179 adapted to mesh with a worm 180 carried by worm shaft 181. Shaft 181 in turn is provided with a crank 182 extending through a slot 183 in the side of the bed frame (Fig. 2). Since the shaft 181 is disposed parallel to the shaft 74 and is close to the axis of shaft 74, the crank 182 may be manually turned while the driving linkage is in operation. The turning of the crank 182 rotates the worm gear 179 and the bolt 178 so as to cause the block 76 to move either toward the axis of the shaft 74 or away from the shaft 74 depending on the direction of rotation of the crank 182. This permits very accurate adjustment of the drive for the feed mechanism.

The upper end of the arm 79 carries a pivoted link 83 which is pivotally connected through ears 85a to the slide 85 for feeding the stock forwardly into the machine 6 and at the same time pulling the stock through the drawing die carried by the assembly 16. The slide 85 is mounted in parallel guideways 86a and 87a and is retained in the guideways by plates 88a and 88b. The feed slide 85 is provided with a wedge grip arrangement similar in certain details to the arrangement described in connection with the slide 37 of the starting feed assembly 15. The feed block 85 is provided with a rectangular opening 86 to receive the assembly of co-operating wedges 87, 88, 89 and 90. The wedges 89 and 90 are fixed in the block 85 and the grip wedges 87 and 88 are movable with respect to the slide 85.

Vertically disposed anti-friction rollers 91 are arranged between the wedge 88 and the fixed wedge 89 and similar rollers 92 are arranged between the wedge 87 and the fixed wedge 90 (Fig. 5). The rollers 91 are urged toward the trailing end of the slide 85 by a spring plunger assembly 93 and a similar spring plunger assembly 94 urges the rollers 92 toward the trailing end of the block 85. The wedges 87 and 88 are normally biased to a grip position by a spring 95 surrounding a quill 96 through which the stock is advanced toward the bolt or nut-forming machine 6. The rear or trailing side of the slide 85 is provided with a pair of axially movable pins 97 and 98, one pin being disposed on each side of the stock entrance 99. The leading end of each of the pins 97 and 98 bears against the narrow end of the wedges 88 and 87, respectively, so that when the pins are advanced to the full line position shown in Fig. 5 the wedges 87 and 88 are in their released position with respect to the stock entering the block at 99 and leaving the block through the quill 96. Alternatively, when the pins 97 and 98 are permitted to retract the spring 95 will, by moving the quill 96 toward the rear or trailing end of the slide, move the wedges 87 and 88 to their gripping position.

To determine when the pins 97 and 98 shall effect a grip or release position, control mechanism is mounted at the trailing end of the slide 85 as best shown in Figs. 4 and 4a. The upper end of the bell crank 100 carried by the block 85 is provided with a pair of spaced ears 101 and 102 and each of said ears is provided with an adjustable pin. The adjustable pins 103 and 104 have the leading ends thereof in alignment with the sliding pins 97 and 98. The lower arm of the bell crank 100 is provided with a roller 105 arranged to ride along a horizontal track member 106. The horizontal track 106 is disposed on the center line of the frame and in the vertical plane of the line of stock being fed into the machine 6. The track 106 is supported at each end thereof by frame carried bell cranks 107 and 108. The lower arm of the bell cranks are pivotally connected to each other by a link 109 so as to provide a parallelogram linkage of which the horizontal track 106 is the upper link. By this arrangement the track 106 may be raised or lowered while it is maintained in a horizontal position. When the slide 85 is reciprocated in its guideways the roller 105 rides along the track 106 and at the same time the track may be raised or lowered so as to determine whether the wedges 87 and 88 will be in grip or released position. When the track 106 is raised it will be noted that the bell crank 100 is rocked so as to move the pins 97 and 98 forwardly with respect to the slide 85. Thus without regard as to the horizontal position of the slide 85 in its reciprocating path, the wedges 87 and 88 may be moved to grip or released position. The grip on the stock being fed may be released without any relative movement longitudinally of the wedges with respect to the stock. In the same way the wedges 87 and 88 may be operated to effect an instant release of the stock without requiring any relative longitudinal movement between the feed slide 85 and the stock.

The means for controlling the raising and lowering of the track 106 includes the cam shaft 31, the cam 27 on the left-hand side of the machine (see Fig. 2) and the mechanism shown in Fig. 4. The cam shaft 31 is journaled in the frame and the end thereof, projecting at the left-hand side of the machine, carries the arm 30 and cam follower roller 29 riding on the cam 27. The cam 27 is connected to the end of the crankshaft 12 projecting at the left-hand side of the machine. Preferably the connection between the crankshaft 12 and the cam 27 includes a disc 27a fixed to the crankshaft 12. The disc 27a carries a series of bolts 27b extending through arcuate slots in the cam 27 so that the cam 27 may be adjusted radially within limits with respect to the crankshaft 12. Within the frame of the machine, the cam shaft 31 has fixed thereto an arm 185 which is normally urged in a counterclockwise direction by the spring 186 surrounding the sliding pin 187 pivoted to the arm 185 as at 188.

An actuating link, indicated in its entirety as at 189, is connected to the arm 185 as at 190 and to the depending arm of bell crank 108 as at 191. The actuating link includes a cylinder 192 which has integrally formed therewith the ear 193 which is pivoted at 191. Within the cylinder 192 is located a heavy coil spring 194 and one end of the spring 194 abuts a shoulder 195 on the pin 196 which terminates in the eye bolt 197 pivoted at 190.

The cam 27 on the crankshaft at the left-hand side of the machine is characterized by a low cam area 198 and a high cam area 199. The cam follower 29 is shown in Fig. 2 as being on the high part of the cam 199 whereas the position of the parts shown in Fig. 4 correspond to a position of the cam wherein the roller 29 is on the low part of the cam 198. When the rotation of the cam 27 moves the roller from low area 198 to the high area 199, the arm 185 is turned in a clockwise direction (Fig. 4) and by means of the connecting link assembly 189 the track 106 is raised, thus releasing the wedge grip of the wedges 87—88 with respect to the stock.

It will be noted that this release of the grip on the stock is determined by the cam 27 which may be independent of the reciprocating stroke of the slide 85. The grip wedges in the slide 85 are held free from the stock as the slide retracts and the release of the grip does not impose any drag on the stock during retraction. Similarly the wedges 87—88 may be brought into gripping position on the stock at any point of the travel of the slide 85 in a feeding direction—that is, in a direction toward the stock gauge in the bolt or nut-forming machine 6.

To provide for release of the grip on the stock independent of its control by the cam 27, an air cylinder 200 is mounted in alignment with the upper end of the arm 185. The piston within the air cylinder 200 is connected to the piston rod 201 which is provided with an adjusting screw 202 arranged to engage the surface 203 on the arm 185 when air is admitted to the cylinder 200. When air is admitted as at 204 by manually operated valve 204a the piston within the cylinder 200 is moved to the right (as viewed in Fig. 4) so as to engage the lever 185 and rock the lever 185 in a clockwise direction. This manual control for the release of the stock may be utilized whenever it is desired to run the machine 6 without feeding stock into the machine 6 so as to clear the machine 6 of cut blanks such as may occur at the end of a run on a particular article.

Whenever the air is exhausted from the cylinder 200 as at 204b, the lever 185 is rocked back to the position shown in Fig. 4 by the spring 186 and is thus ready to resume normal operation by the cam 27.

In the operation of the drawing and feeding apparatus, the end of a coil of stock is introduced into the quill 35 at that end of the machine remote from the bolt or nut-forming machine 6. Such stock is moved manually by the operator along the line of feed into position between the wedges 46—47 in the starting feed slide 37. The quill 58 is retracted from the wedges 46—47 so that the wedges are moved by the spring assemblies 52 and 53 into gripping position on the stock. The motor 20 is then started so as to reciprocate the starting feed slide 37. The operation of the motor 20 rotates the drawing die in the assembly 16 so that stock being advanced by the starting assembly 15 is drawn by the rotating die as the stock is advanced along the line of feed into the slide 85. The rotation of the die permits large diameter reductions without buckling the stock between the starting grip feed and the drawing die. When sufficient drawn stock is positioned between the wedges 87—88 so that the stock may be gripped for the full extent of the wedges, the bolt or nut-forming machine may be started and the motor 20 shut off.

As the chain 10 driven by the machine 6 rotates the crankshaft 12, the feed slide 85 is reciprocated in timed relation to the header slide, the shear and other moving parts of the machine 6. The drawn stock is thereafter advanced step-by-step in an amount determined by the various adjustments for the stroke of the feed slide and the opening and closing of the grip wedges 87—88 as determined by cam 27. When the grip on the stock being fed is released with the leading end of the stock against the stock gauge in the machine 6, there are no forces acting on the stock to impart any movement to the stock away from the stock gauge. Thus the feed of the stock is accurately controlled and each cut blank provides the same volume of metal for the successive blanks to be formed. Preferably the cam 27 which releases the grip on the stock in the slide 85 and the stroke of the slide 85 as controlled by the crank 182 is such that the stock strikes the stock gauge 6a in the machine 6 at the same time that the slide 85 completes its forward stroke and at the same time that the grip on the stock is released. Stock thus fed results in all cut blanks for forming nuts or the like in the machine 6 having the same volume of metal.

Although I have shown and described one form of my drawing and feeding apparatus in considerable detail, it will be understood that variations may be made therein without departing from the scope of the invention as defined in the following claims:

What is claimed is:

1. Stock moving apparatus comprising a frame, a slide mounted for horizontal reciprocation on said frame, grip wedges mounted in said slide, spring means carried by the slide normally urging said wedges into gripping position with respect to the stock to be moved, release means carried by said slide engaging said grip wedges, horizontal track means mounted on the frame adjacent the path of reciprocation of said slide, said track means mounted on the frame for movement transversely of the path of slide reciprocation, and engaging said release means on the slide to release said wedges with respect to the stock being moved.

2. Stock moving apparatus comprising a frame, a slide mounted for reciprocation on said frame, grip wedges mounted in said slide, spring means carried by the slide normally urging said wedges into gripping position with respect to the stock to be moved, a bell crank mounted for pivotal movement on said slide and having one arm thereof operatively connected to said grip wedges, track means mounted on the frame beneath the path of reciprocation of said slide, said track means engaging the other arm of said bell crank and means to move the track transversely of the path of slide reciprocation to move the bell crank and wedges against the bias of said springs and release the stock.

3. Apparatus for drawing and feeding wire stock comprising a frame, a drawing die mounted on said frame and fixed thereon against longitudinal movement with respect to the frame, a feed slide mounted for reciprocation on the frame in a horizontal path in alignment with said drawing die, means to reciprocate said feed slide, a movable track on the frame providing a surface parallel to the path of reciprocation of the feed slide, movable grip means carried by the feed slide, spring means carried by the slide normally biasing said grip means to gripped engagement on the stock to be drawn and fed, slidable pins mounted in said slide engageable with said grip means, a bell crank pivoted on the slide having one arm thereof in engagement with said pins and the other arm thereof in engagement with said track whereby movement of the track transverse of the path of the slide moves said bell crank and moves said pins to effect release of the grip means with respect to the stock.

4. Wire feeding apparatus comprising a frame, horizontal guideways in the frame, a feed slide mounted for reciprocation in said guideways, stock gripping means carried by the slide, spring means normally biasing said stock gripping means into engagement with the wire stock to be fed, a track carried by the frame having a surface extending parallel to the path of the feed slide, grip release members mounted for sliding movement in the feed slide, a lever pivoted on the feed slide having one portion of the lever bearing against said release members and another portion of the lever bearing against said track, means to move said track transversely of the path of reciprocation of the feed slide whereby said lever is moved about its pivot and said grip release members move the stock gripping means in opposition to said spring bias to released position with respect to the wire stock.

5. Wire feeding apparatus comprising a frame, horizontal guideways in the frame, a feed slide mounted for reciprocation in said guideways, stock gripping means carried by the slide, spring means normally biasing said stock gripping means into engagement with the stock to be fed, a horizontal track mounted for movement on the frame toward and away from said slide, grip release pins mounted for sliding movement in the feed slide, a member pivoted on the feed slide having one portion thereof bearing against said release pins and another portion thereof bearing against said track, means to move said track with respect to said feed slide whereby said member is oscillated and said release pins move the stock gripping means in opposition to said spring bias to released position with respect to the wire stock.

6. Stock feeding apparatus for operation in timed relation to a header slide machine for making metal articles having a rotating member moving in synchronism with the header slide of the machine, said apparatus comprising a bed frame, a crankshaft in the bed frame, drive means coupling said crankshaft to said rotating member on said machine machine, means to convert the rotation of the crankshaft to oscillating motion, a slide mounted for reciprocation on the bed frame coupled to said last-named means whereby the slide is reciprocated in timed relation to said header slide machine, a cam driven by said crankshaft, grip wedges carried by said slide, spring means normally biasing said grip wedges into gripping engagement with the stock to be fed, wedge release means mounted for movement with respect to said slide and cam control means operatively connecting said cam and said wedge release means whereby rotation of the cam releases said wedges with respect to the stock being fed.

7. Stock moving apparatus for operation in timed relation to a header slide machine for making metal articles wherein said machine is provided with a stock gauge, a bed frame for said apparatus, a crankshaft in the bed frame, drive means coupling said crankshaft to said header slide machine to rotate the crankshaft, means to convert the rotation of the crankshaft to oscillation of a drive lever, a slide mounted for reciprocation on the bed frame coupled to said drive lever whereby the slide is reciprocated in timed relation to said header slide machine, a cam turned by said crankshaft, grip wedges carried by said slide, spring means normally biasing said grip wedges into gripping engagement with the stock to be moved against the stock gauge, wedge release means mounted for movement with respect to said slide and cam actuated means operatively connecting said cam and said wedge release means whereby rotation of the cam releases said wedges with respect to the stock.

8. Apparatus for drawing and feeding rod stock comprising a frame, a drawing die fixed against longitudinal movement in the frame, a reciprocating feed slide, stock gripping means carried by the feed slide, an oscillating lever to reciprocate the feed slide, a cam rotated as said lever moves the feed slide, grip release means carried by the feed slide, links interconnecting said grip release means and said cam to move the grip release means to released position as the slide is moving with respect to said drawing die.

9. Apparatus for drawing and feeding wire stock comprising a frame, a drawing die mounted on said frame, a feed slide mounted for reciprocation on the frame in a horizontal path in alignment with said drawing die, means to reciprocate said feed slide, a vertically movable track mounted on the frame beneath the feed slide having a surface parallel to the path of reciprocation of the feed slide, grip means carried by the feed slide, spring means carried by the feed slide normally biasing said grip means into engagement with the stock to be drawn and fed, pins mounted in said feed slide for sliding movement with respect to the feed slide engageable with said grip means, a crank pivoted on the feed slide having one arm thereof in engagement with said pins and the other arm thereof in engagement with said track whereby vertical movement of the track oscillates said crank and moves said pins to effect disengagement of the grip means with respect to the stock.

10. Apparatus for drawing and feeding rod stock comprising a frame, a drawing die fixed against longitudinal movement in the frame, a reciprocating feed slide movable toward and away from the fixed drawing die, a stock gripping means carried by the feed slide, means to reciprocate the feed slide, a cam turned by said means for reciprocating the feed slide, grip release means carried by the feed slide, means interconnecting said grip release means and said cam to move the grip release means to a released position as the slide is reciprocated with respect to the drawing die.

(References on following page)

References Cited in the file of this patent

UNITED STATES PATENTS

| | | |
|---|---|---|
| 1,187,827 | Gibbs | June 20, 1916 |
| 2,228,746 | Berkebil | Jan. 14, 1941 |
| 2,234,728 | Gaines | Mar. 11, 1941 |
| 2,728,447 | Ware | Dec. 27, 1955 |
| 2,797,799 | Ehlert | July 2, 1957 |

FOREIGN PATENTS

| | | |
|---|---|---|
| 739,291 | Great Britain | Oct. 26, 1955 |